US006547201B2

(12) United States Patent
Barich et al.

(10) Patent No.: US 6,547,201 B2
(45) Date of Patent: Apr. 15, 2003

(54) COMPACT DISK HOLDER

(76) Inventors: Rick J. Barich, 31323 Woodsia La., Eugene, OR (US) 97405; Maxwell R Ward, 3180 Agate St, Eugene, OR (US) 97405

(*) Notice: Subject to any disclaimer, the term of this patent is extended or adjusted under 35 U.S.C. 154(b) by 21 days.

(21) Appl. No.: 09/733,793

(22) Filed: Dec. 11, 2000

(65) Prior Publication Data

US 2002/0070323 A1 Jun. 13, 2002

(51) Int. Cl.$^7$ .................................................. A47G 1/10
(52) U.S. Cl. ................. 248/316.7; 206/228; 206/308.1; 211/40; 248/231.81; 248/309.1
(58) Field of Search .......................... 248/309.1, 309.2, 248/305, 306, 307, 231.81, 113, 298.1, 299.1, 316.7; 206/303, 308.1, 228; 211/40; 138/162, 92; D6/407

(56) References Cited

U.S. PATENT DOCUMENTS

| | | | | |
|---|---|---|---|---|
| 1,789,276 A | * | 1/1931 | Kenney | ...................... 248/262 |
| 2,251,744 A | * | 8/1941 | Kurath et al. | ........... 248/113 X |
| 3,295,806 A | * | 1/1967 | Modeme | ...................... 248/74.4 |
| 4,121,798 A | * | 10/1978 | Schumacher et al. | ........ 248/113 |
| 4,871,065 A | | 10/1989 | Hehn | |
| 4,908,817 A | | 3/1990 | Sandell | |
| D350,448 S | | 9/1994 | Hill | |
| 5,344,028 A | | 9/1994 | Angele | |
| 5,505,299 A | | 4/1996 | Opticard | |
| 5,593,030 A | | 1/1997 | Tell | |
| 5,609,258 A | | 3/1997 | Spector | |
| 5,116,003 A | * | 4/1997 | Gerhardt | ...................... 248/312 |
| 5,931,291 A | | 8/1999 | Sedon | |
| D429,578 S | * | 8/2000 | Vesco | ........................... D6/407 |
| 6,237,763 B1 | * | 5/2001 | Lau | ........................ 206/308.1 |
| 6,264,147 B1 | * | 7/2001 | Mitchell | ...................... 248/111 |
| D456,166 S | * | 4/2002 | Seltzer | ........................ D6/407 |

* cited by examiner

Primary Examiner—Korie Chan
Assistant Examiner—Tan Le

(57) ABSTRACT

A CD disk holding device that freely suspends a disk. The holder is made up of a singular homogeneous flat plastic or plastic like flexible material of a thin and uniform cross section that is formed into a trihedrally shaped structure. A flat base provides an area for attachment to a desired surface. Projecting from opposite ends in an inwardly biased folded plane of the base are two flexible symmetrical arms. Further projecting away from base at the end of the arms are related symmetrical tapered nose sections. The nose sections are arched further inward in a slightly open clamshell arrangement. Each nose section has a leading edge, which when viewed from the front form the diagonal edge of a near parabolic cone structure. This cone structures greatest diameter is normally slightly greater than the central mounting hole of a compact disk. When a CD is installed, the central hole of the CD rides the leading edge of the nose sections until seated. Further pressure causes a cam action deformation of the nose sections inwardly; reducing the diameter of the cone structure until it is less than the diameter of the central hole of the CD. The CD is then free to travel down the holder until it strikes the disk stop face where it is releasably held in the disk rest area.

1 Claim, 5 Drawing Sheets

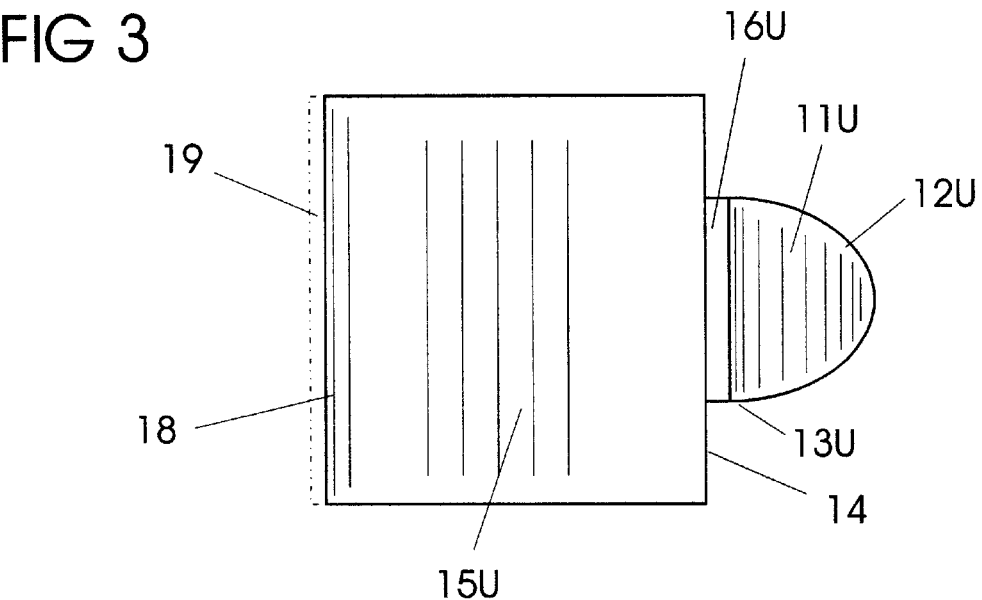
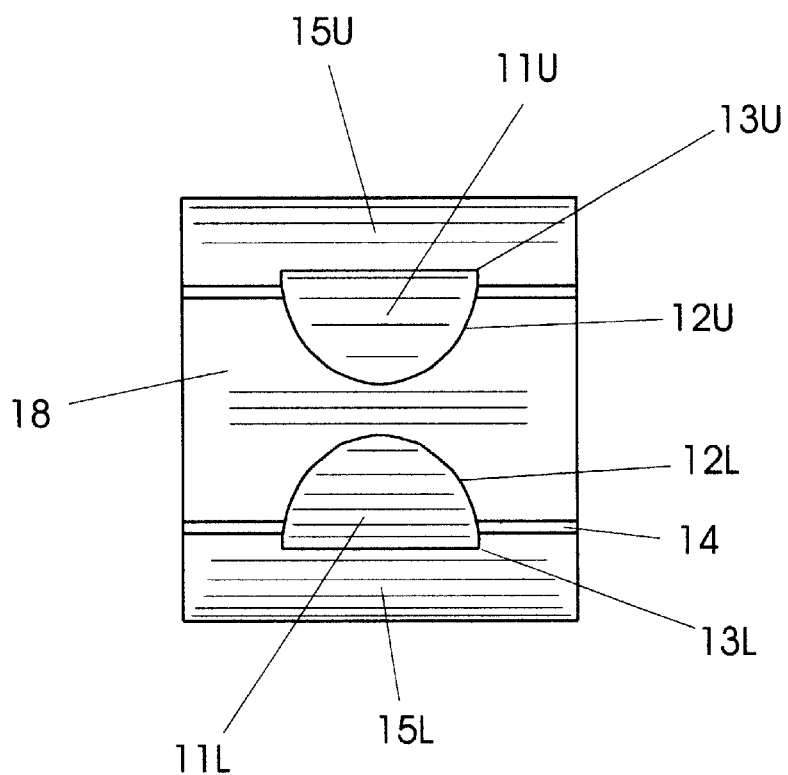

COMPACT DISK HOLDER

BACKGROUND

1. Field of Invention

This invention relates to holding or hanging devices, specifically to holding or hanging devices used to store compact optical disks or other similar disk-like objects.

2. Discussion of Prior Art

The invention of the compact optical disk (hereafter referred to as CD or disk), which provides a storage means for data for use in computers and audio devices, brought forth the need for a variety of storage apparatus for the disk itself Taking into consideration the sensitive structure of the CD and its repeated interaction with the playing device, required a storage apparatus which provides both ease of disk accessibility and the protection of the sensitive disk data surface Previous methods have focused on a variety of containers, sleeves, or compartments, which have encapsulated the disk often resulting in ineffectively meeting user needs and/or disk data surface protection.

Users require accessibility in obtaining specific CDs when needed. Quick visual identification and accessibility are particularity required in multiple disk programs which need repeated transfer between storage and play device and in a general business environment where time is of the essence. The need for speed and ease in the act of removal and re-storage of disks is important to provide a time-in-motion cost savings as well as convenience of use. Also, not all storage methods take into consideration the mechanics of disk handling. Unfortunately, CDs are difficult to handle. The very thin disk shape is difficult to grasp off a flat surface and hard to properly acquire from many storage containers. The proper handling of disks only by the edges, with most storage methods, requires use of both hands and your full attention during disk exchanges.

Effective storage methods protect the sensitive disk face from scratches, fingerprints, dirt and other similar factors, which may cause degradation of the data surface of the disk. This is particularity difficult to accomplish when the data surface touches anything other than air. Even minute dirt particles can cause scratches when rubbed between disk and another surface. Since the reading head in the disk playing device does not make contact with the disk itself, almost all contamination of the disk surface occurs outside the player.

The standard method of storage for the CD is the jewel case. It is a hinged clear case, which provides a complete encapsulation of the disk. In actual use, however, the traditional jewel case has material drawbacks. In order to exchange a disk in a player with one in a jewel case, a series of approximately nine time consuming hand motions must be accomplished. The exchange requires both hands and a material degree of both dexterity and concentration. Often the only handy jewel case for an installed CD is the case of the incoming exchange disk, resulting in CDs in mislabeled cases. When repeated exchanges of CDs are required, as in multiple disk programs for example, the manipulation in and out of cases become not only time consuming but laborious. Often users will not even bother to re-case disks leading to potential damage to data surfaces when cast about the desktop. In addition, other mechanical drawbacks are associated with jewel cases. Disks often bind on the central hub during removal and due to the sliminess of the case the finger holes are very shallow which can hinder a firm grip. Several other types of encapsulated case methods have been proposed—for example U.S. Pat. No. 5,931,291 to Sedon et al. (1999), U.S. Pat. No. 5,593,030 to Tell (1997), U.S. Pat. No. 4,908,817 to Sandell et al. (1990), and U.S. Pat. No. 4,871,065 to Hehn et al. (1989) all suffer similar drawbacks as the standard CD Jewel Case.

Inventors created storage cases with stacked retaining trays for easy access to CDs. U.S. Pat. No. 5,505,299 to Opticard, Inc. (1996) and U.S. Pat. No. 5,344,028 to Angele (1994) discloses a complex tray system which allows access to a variety of stored CDs. These methods still require a second hand to remove the CD from the tray and have many of the drawbacks of the jewel case, undermining the concept of a quick and easy exchange of disks. The system would also be prohibitively expensive, lack an effective automotive use and would not support proper edge handling of disks.

Several types of flexible sleeve storage systems in a notebook type form have been proposed. For example U.S. Pat. No. 350,448 to Hill (1994) discloses such a storage system. Though highly portable in nature, the sliding of CDs in and out of sleeves can result in potential damage to the sensitive data surface and the mechanics of physical removal and reentry of CDs into the sleeves prevents proper edge handling of the disks. Used extensively in automotive storage of disks, the cumbersome disk exchange procedure associated with sleeve systems is a distraction to driving, particularly at night. In addition, using a sleeve storage method is an excessive time and motion consuming process.

Spector (1997) discloses a method of open display of CDs in a wall hanging array in U.S. Pat. No. 5,609,258. Quick visual identification and avoidance of container manipulation are valid positive aspects of this method. An array of CDs in a wall hanger display, however, is a space sensitive device. Not many users have available wall space within easy reach of their computer desk and automotive use for audio CDs would be unworkable. Having desired CDs be in close proximity to work is essential to rapid disk exchanges. In addition, the ease of placement and extraction of the disk into and out of the display along with proper edge handling reflect the same problems faced in the jewel case method.

A variety of hub structures have been invented to secure CDs via their central mounting hole (pertinent previously disclosed patents). They consist of either a plethora of resilient fingers (as in the standard jewel case) or a cylindrical hub, which is elasticity deformed radially inward to releasably hold a disk. All are designed to operate as a disk holding structure within the confines of an encapsulating container or box and not independently. In addition, most hub structures have material physical contact with the central hole resulting in increased friction and a resulting tendency to bind, making extraction somewhat difficult.

OBJECTS AND ADVANTAGES

Accordingly, several objects and advantages of our compact disk holder are:

(a) To provide a storage means for CDs which does not damage the data surface of the disk, the data portion of the CD making only physical contact with air.

(b) To provide a storage means with extremely rapid accessibility of specific CDs through the storage of most needed disks within close proximity to the user.

(c) To provide a storage means, which allows total ease in acquiring and re-storing of disks without binding, fuss or fumbling.

(d) To provide a storage means which optimally locates the disk in a position which is most mechanically conducive to proper edge handling.

(e) To provide a storage means which dramatically improves speed of interaction in disk exchange procedures with small groups of disks.

(f) To provide a storage means which requires less dexterity and concentration in disk exchanges.
(g) To provide a storage means that requires the use of only one hand for either installation or extraction of the disk.
(h) To provide a storage means where identifying labels are in full view for instant recognition.
(i) To provide a storage means for use with automotive CD players, which results in materially less cumbersome disk exchanges and thus safer vehicle operation.
(j) To provide the operator with a pseudo "third hand" to temporarily hold disks when needed.

Further objects and advantages are to provide a storage means which is simple to use and inexpensive to manufacture and can be used repeatedly without fail. Still further objects and advantages will become apparent from a consideration of the ensuing description and drawings.

DRAWING FIGURES

FIG. 3 shows a top view of the basic version

FIG. 4 shows a front view of the basic version

PREFERRED EMBODIMENT REFERENCE NUMBERS

Figure 1:
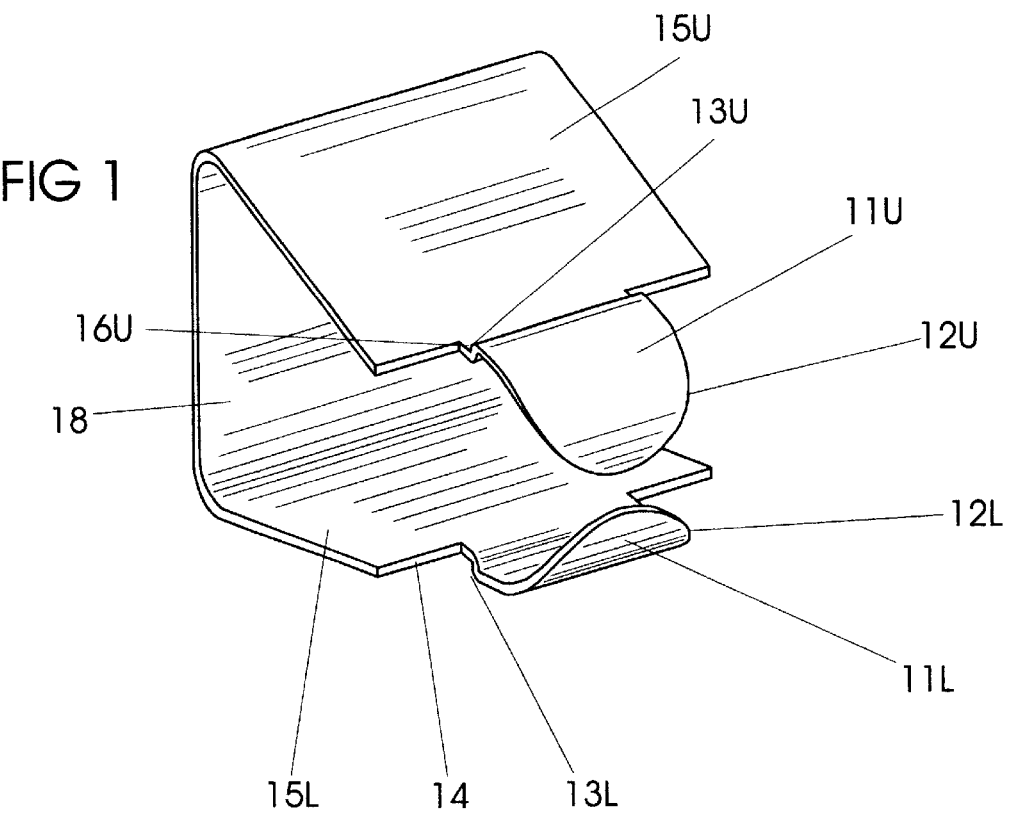
FIG. 1 shows a perspective view of the basic version of our CD holder.

11U Upper tapered nose section
11L Lower tapered nose section
12U Upper leading edge
12L Lower leading edge
13U Upper retaining bump
13L Lower retaining bump
14 Disk stop face
15U Upper offset arm
15L Lower offset arm
16U Upper disk rest area
16L Lower disk rest area
17 Travel gap
18 Base
19 Attachment means
Additional Reference—Hanging Type Embodiment
20 Chamfered hub
21 Hole locating taper
22 Seating taper
23 Retaining slot
24 Rounded nose
25 Offset body
26 Disk stop
27 Offset body base
28 Attachment mechanism
Additional Reference—Hinged Type Embodiment
31 Living hinge
32 Stop rib
33U Upper clamshell section
33L Lower clamshell section
34U Upper base disc
34L Lower base disc
35U Upper stop face
35L Lower stop face
36 Flexing slit
37U Upper disk offset
37L Lower disk offset
38U Upper disk seat
38L Lower disk seat
39U Upper retaining ridge
39L Lower retaining ridge
40U Upper guiding taper
40L Lower guiding taper
41 Nose
42 Attachment device

DESCRIPTION OF INVENTION

Figure 2:
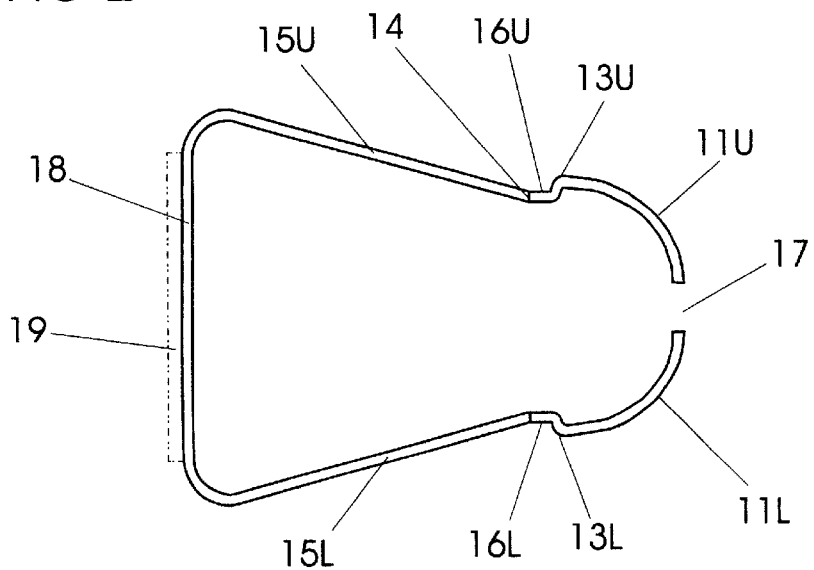
FIG. 2 shows a side or horizontal plane view of the basic version

A preferred embodiment of our Disk Holder is illustrated in FIG. 1 (perspective), FIG. 2 (side), FIG. 3 (top) and FIG. 4 (front). The holder is made up of singular homogeneous flat plastic or plastic like flexible material of a thin and uniform cross section, which is formed through manipulations of a singular plane into a generally trihedral shaped structure. The injection mold process preferably manufactures the holder. The central section of the generally trihedral shape is a flat base 18, which provides the attachment area for mounting the CD holder to a desired surface via one of a variety of standard attachment means 19. When viewed horizontally from the side (FIG. 2), projecting from upper and lower opposing ends and in a folded plane of base 18 are two flexible symmetrical arms, an upper offset arm 15U and a lower offset arm 15L. These arms have a length which is equivalent to the optimal distance for proper edge handling of a suspended disk which is approximately ½ to ¾" from the mounting surface and a width somewhat greater than the diameter of the central mounting hole of a CD. Upper arm 15U and lower arm 15L are symmetrically opposed and are formed at an angle somewhat less than perpendicular to base 18 with an inwardly angled bias toward each other. Adjacent to and projecting from upper arm 15U and lower arm 15L away from base 18 is a upper tapered nose section 11U and a lower tapered nose section 11L respectively. Each symmetrically opposed nose section is arched further inwardly as viewed horizontally as in FIG. 2, terminating in near contact with each other, in a semi-open clamshell arrangement. The space between the termination points of upper nose section 11U and lower nose section 11L at the point furthest from base 18 is a travel gap 17 which allows related upper and lower nose sections and arms to further deform inwardly.

Each nose section has a related upper leading edge 12U and a lower leading edge 12L, which is defined as the outermost edge point on the nose section from the central axis of the holder. Leading edges 12U and 12L when viewed from the front (FIG. 4) form the diagonal edge of a near parabolic cone, whose greatest diameter is normally slightly greater than the central mounting hole of a standard CD and whose diameter can vary when arms 15U and 15L are flexed. At the largest diameter point of the cone formed by leading edges 12U and 12L is a associated upper retaining bump 13U and a lower retaining bump 13L which are formed when the nose sections are constricted toward each other as viewed in the horizontal plane (FIG. 2). Adjacent to retaining bumps 13U and 13L toward base 18 is an associated upper disk rest area 16U and a lower disk rest area 16L, whose horizontal length approximates the thickness of a CD. The cone structure diameter formed by the leading edges at upper and lower disk rest areas 16U and 16L is roughly equivalent to the diameter of the central hole of a CD. Adjacent to the disk rest areas at the junction between the nose sections and the arms are the disk stop faces 14 which is the area of differential width between arms and disk rest areas as viewed from the vertical plane (FIG. 3).

Operation of Invention

The operator determines one or more locations where he or she desires an interactive disk storage area. This can be the dash of a car, side of a computer monitor or stereo component, wall, desk or other desirous area, which provides convenience of location and a reasonably flat surface for mounting. The operator then attaches the CD holder to the desired surface via a standard peel and stick adhesive backing 19 or other means such as velcro or magnetic.

Use of the CD holder is initiated when the operator obtains a CD, either from a storage container or directly from a player and desires to keep the disk in a quick-access mode. The CD is carried to the holder in the standard accepted manner, with a finger hold grasp by CD edges only, with thumb opposing spread fingers. The operator then maintains a CD position roughly perpendicular to the axis of the holder and guides the central mounting hole of the CD onto the front of the nose sections 11U and 11L. As the CD is slid further down the nose section toward base 18, the inside edge of the CDs central mounting hole makes contact with one of the leading edges 12U or 12L. This leading edge then physically aligns the CD to a point of concentricity in relation to the axis of the holder. Since the largest diameter formed by the leading edges is slightly larger than the CD mounting hole, eventually all four contact points of leading edge 12U and 12L make full contact at approximately the area of upper and lower retaining bumps 13U and 13L. Continued sliding of the CD toward base 18 results in a cam action inward pressure flexing arms 15U and 15L toward each other and reducing the annular diameter formed by the leading edges. When the diameter formed by the leading edges becomes less than the diameter of the mounting hole of the CD, the CD then rides over retaining bumps (13U and 13L striking stop faces 14. The CD is held against the stop faces 14 and sits in disk rest area 16U and 16L which has a leading edge diameter slightly less than the leading edge diameter at retaining bump 13U and 13L location. This allows the arms 15U and 15L to regain their original position, flexing slightly outward, away from each other, securing the CD. The holder positions the CD at the appropriate distance from the mounting surface so that the mounting surface can be used as a reference for a proper fingerhold grasp.

Removal of the CD is accomplished by positioning the hand around the suspended disk in the standard thumb-opposing finger configuration. When the fingertips just make contact with the mounting surface the fingers are positioned at the proper distance for a positive correct-method hold. This effective placement of the freely suspended disk minimizes visual interaction. Having grasped the CD, the operator then removes the disk in several ways. Direct pulling of the CD away from the base and roughly concentric with the axis of the holder will result in the CDs central hole riding up the leading edges of retaining bumps 13U and 13L which will flex arms 15U and 15L inwardly. This reduces the diameter of the leading edge until it is smaller than the CDs central hole and the disk will slide off the tapered nose sections 11U and 11L. The other method of removing the CD would be to lift either up or down on the disk and rotate slightly to dislodge the disk. If lifting upward on a CD in the rest area position then the lower arm 15L would flex upward, reducing travel gap 17 and reducing the diameter formed of the leading edges 12U and 12L. As viewed horizontally (FIG. 2), the CD then could be rotated slightly clockwise until the upper edge of the CD mounting hole cleared the upper retaining bump 13U. This in turn would allow slight dropping of the disk due to the reduced diameter of the upper nose 12U in the CDs angled position. The lower portion of the CD mounting hole would then clear the lower retaining bump 13L to allow the disk to slide off the tapered nose. An optional additional removal procedure would incorporate the operator's forefinger, which would apply pressure to the nose sections 11U and 11L as the disk is being held with the thumb and remaining fingers. This pressure would collapse upper and lower arms 15U and 15L toward each other reducing travel gap 17 and thus facilitate disk removal.

Description of Alternative Embodiment—Hanging Type

Figure 5:
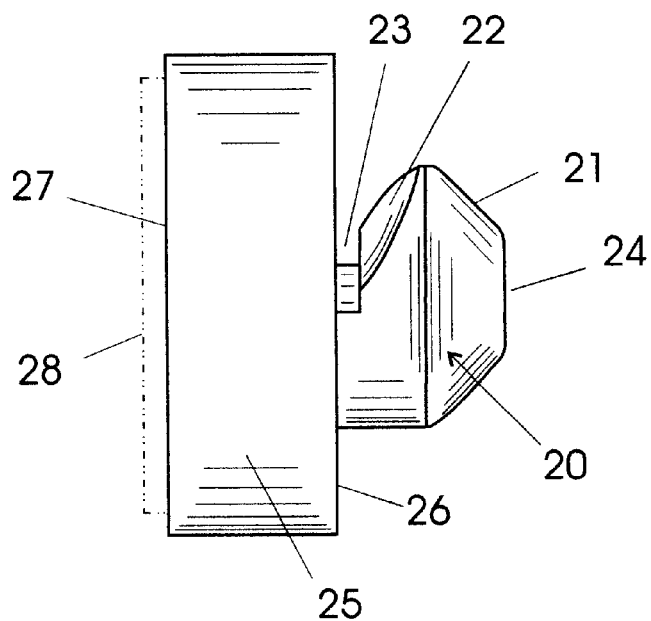
FIG. 5 shows a side view of a hanging-type
Figure 6:
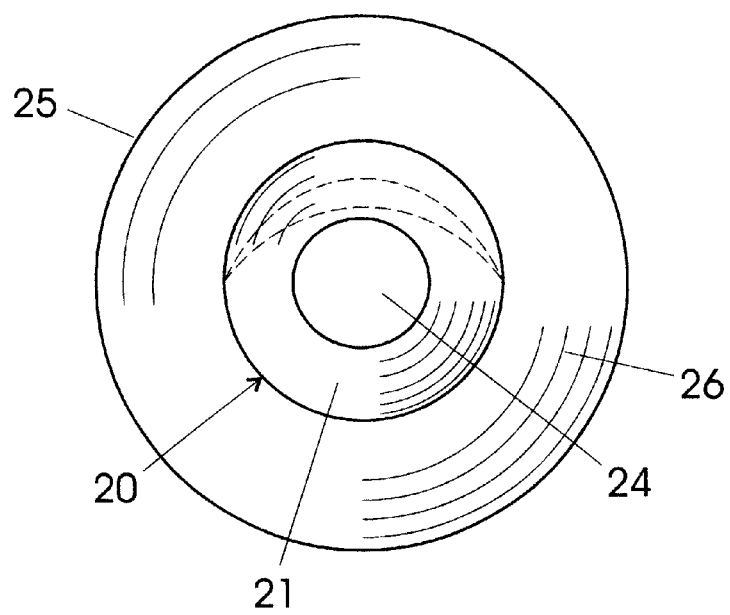
FIG. 6 shows a front view of a hanging-type

An alternative embodiment of the CD holder is illustrated in FIG. 5 (side) and FIG. 6 (front). The holder is made from a plastic or plastic like material formed in a general cylindrical shape of varying diameters. One end of the holder is a offset body 25 whose diameter is greater than the central hole of a CD, preferably ¾ to 1 inch in diameter and width is preferably ½ to ¾ inches as viewed from the side (FIG. 5). One end of offset body 25 when viewed from the side (FIG. 5) forms an offset body base 27, the area for attachment to a desired surface via an attachment device mechanism 28. Projecting from and concentric with offset body 25 on the opposing side of base 27 is a chamfered hub section 20 whose greatest diameter as viewed from the front (FIG. 6) is slightly less than the central hole of a CD. A disk stop 26 is that area of the end face of the offset body 25 opposite of base 27 which is not covered by hub 20, as viewed from the front (FIG. 6). Adjacent to stop 26 and cut into hub 20 is a retaining slot 23 which is slightly wider as viewed from the side (FIG. 5) than the thickness of a CD. The retaining slot 23 is a circular cut whose axis is offset from the shared axis of body 25 and hub 20, cutting into approximately ½ the circumference of the hub. Adjacent to and on a near shared axis with slot 23 is a seating taper 22 which is a conical taper on hub 20 whose reduced diameter faces offset body 25. Adjacent to seating taper 22 is hole locating taper 21 which is a conical taper on a shared axis with hub 20 whose reduced diameter faces away from main body 25 and ends at the farthest point from body 25 at a rounded nose 24.

Operation of Alternative Embodiment—Hanging Type

The hanging type embodiment of the CD holder is initially used in a similar manner as the preferred embodiment. The operator places the CD in an approximate perpendicular position to the axis of the offset body 25. Using the rounded nose 24 as a guide for the central hole of the CD, the operator slides the CD down hub 20 toward body 25. As this is done there is contact between the edge of the CDs central hole and a point in the conical taper of locating taper 21 which physically corrects the CD into proper alignment with hub 20. After the CD passes the transition point between the locating taper 21 and seating taper 22 the operator can release the CD. Upon release, the central hole of the CD makes contact with seating taper 22 which causes the CD to slide toward retaining slot 23 at stop 26. Using gravity for power, seating taper 22 works in conjunction with stop 26 to adjust the CD into proper alignment until it comes to rest securely in retaining slot 23. To remove the CD from the holder, the operator simply takes hold of the CD in the standard finger hold method and lifts the CD up and away from main body 25. The CD dislodges from retaining slot 23 and slides up seating taper 22 until the transition point between seating taper 22 and locating taper 21 is passed and the disk is freed.

Description of Alternative Embodiment—Hinged Type

Figure 7:
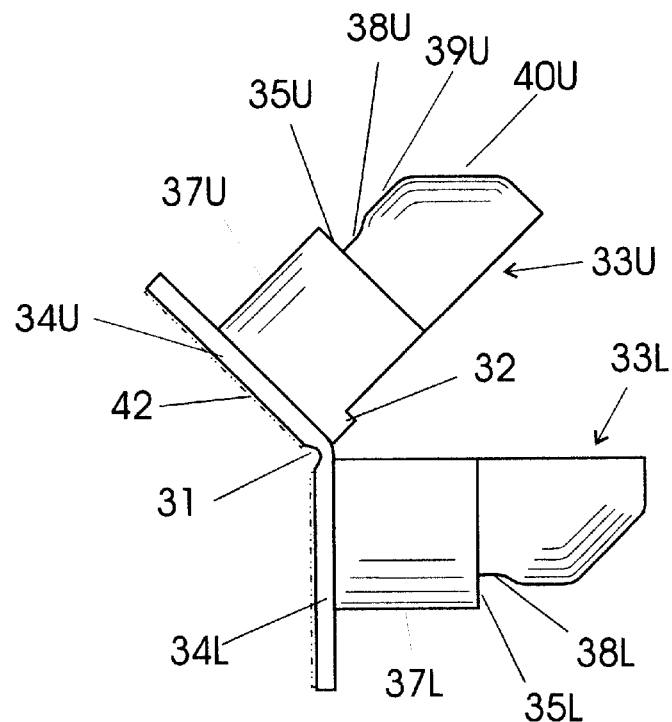
FIG. 7 shows a semi-open side view of a hinged version
Figure 8:
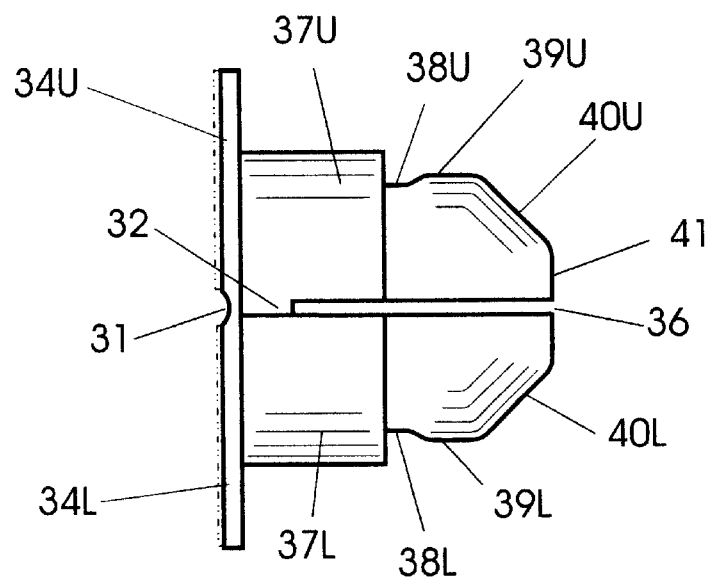
FIG. 8 shows a closed side view of a hinged version.
Figure 9:
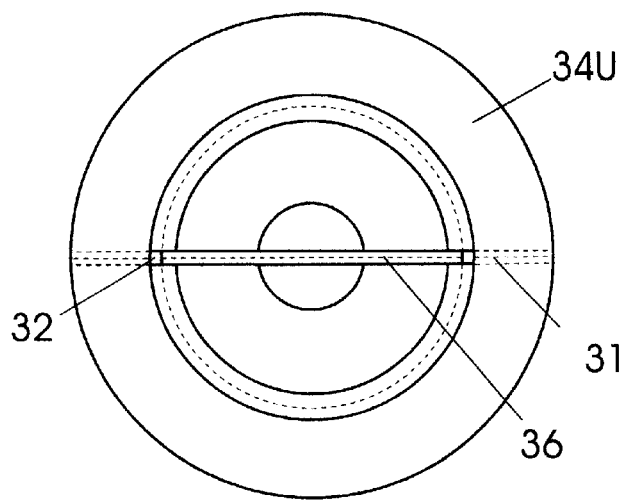
FIG. 9 shows a front view of a hinged version.

Another alternative embodiment of the CD holder is illustrated in FIG. 7 (side semi-open), FIG. 8 (side—closed)

and FIG. 9 (front). The holder is made from a plastic or plastic like material viable for living hinge function, formed in a general cylindrical clamshell shape of varying diameters as shown in FIG. 8. One end of the general cylindrical shape of the CD holder is an attachment device 42 similar to that found in the other embodiments. This attachment device is joined to two symmetrical halves of a singular flat base disc, an upper base disc 34U and a lower base disc 34L. Upper base 34U and lower base 34L are connected to each other via an area of reduced thickness in width as viewed from the side (FIG. 7) forming a living hinge 31. Hinge 31 is a filister that passes contiguous through a plane perpendicular to the axis of the base disk as shown in FIG. 9. This reduced thickness in the area formed by hinge 31 weakens the structure of the disc so that upper base and lower base are articulated, flexing in angular respect to each other. Protruding from, and sharing the same axis with upper base 34U and lower base 34L is a upper clamshell section 33U and a lower clamshell section 33L respectively. When upper and lower base flex to a position of the same perpendicular plane to the disk axis then a rib stop 32, located on upper clamshell 33U adjacent to upper base 34U at living hinge 31, makes contact with lower clamshell 33L as shown in FIG. 8. In this position, stop 32 prevents the complete contact of upper and lower clamshells, producing a flexing slit 36. The half cylinders formed on the upper and lower clamshells adjacent to the base are an upper disk offset 37U and a lower disk offset 37L. When in the closed position as shown in FIG. 8 the cylinder formed by the disk offsets is approximately ½ to ¾ inches in length and is slightly larger in diameter than the central hole of a CD. This offset cylinder terminates in an upper disk seat 38U and a lower disk seat 38L, which form a cylinder with a diameter equal to the central hole of a CD. The differences in the diameters of the cylinder formed by the disk offsets and the disk seat areas create a upper stop face 35U and a lower stop face 35L. Adjacent to upper and lower disk seats away from the bases are upper retaining ridge 39U and lower retaining ridge 39L, which form a cylinder of slightly greater diameter than the central hole of a CD. Adjacent to the upper and lower retaining ridges is a upper guiding taper 40U and a lower guiding taper 40L which together form a conical taper whose reduced diameter faces away from the base and terminates at the farthest point at a nose 41.

Operation of Alternative Embodiment—Hinged Type

The folding type CD holder is an injection molded part and would most likely be presented to the operator in the molded or fully open position. The operator would then physically close the upper clamshell section 33U toward lower clamshell section 33L along hinge 31 until in the closed position. The operator would then attach the holder to the preferred area for disk access via a standard attachment device 42. The flat plane of the attached to surface would maintain pressure radially inward on the two clam shell halves to keep the holder closed. The operator would then use the folding type holder in much the same way as the preferred embodiment. The operator would use the nose 41 as a visual guide for the mounting hole of the disk and slide the CD toward the base until contact and seating is made between the edge of the central hole of the CD and the guiding tapers 40U and 40L. Further movement of the CD toward the base would result in the aligning of the disk into concentricity with the central axis when full contact is made between the edge of the central hole and the guiding tapers.

Further movement of the CD toward the base would force the upper clamshell 33U and lower clam shell 33L to be deformed inwardly until the diameter of the cylinder formed by the clam shells at the area of the retaining ridges 39U and 39L becomes less than the diameter of the central hole of a CD. The CD then physically slides over the retaining ridge area and continues in the direction of the base until it strikes the stop 35U and 35L. Here the pressure exerted by the constriction of the retaining ridges no longer applies and the clamshells resume their initial position, seating the CD in the disk seat area 38U and 38L. Removal of the CD is similar to that of the preferred embodiment. The CD is grasped, vertical biased pressure is applied to deform the clamshells toward each other and the CD is free to be pulled or rotated off Conclusion, Ramifications, and Scope of Invention Accordingly, the reader will see that our CD hanging device is a very convenient, highly reliable, useful, and much needed storing device for CDs.

It promotes the fastest possible disk exchanges, providing both superior installation and extraction of disks into a storage mode.

It provides a useful and needed "third hand" for safe temporary storage.

It is a highly safe method for storage, not prone to damage sensitive data surfaces.

It provides superior hand access to disks, being freely suspended in just the proper position for effective thumb-opposing-spread finger edge handling.

It creates a time-in-motion savings over other methods which results in a cost savings in business.

It promotes quicker identification of disks, being in full view of operator, than other methods.

It provides materially safer automotive use by reducing concentration and time required for disk exchanges.

It provides superior physical interaction with disks, requiring only one hand for disk exchanges.

It provides a CD storage method that is more economical to manufacture.

While my above descriptions contain many specificities, these should not be construed as limitations on the scope of the invention, but rather as an exemplification of three embodiments thereof Many other variations are possible. For example a triangular base to reduce mass; an upwardly angled proboscis on a hanging-type holder to aid in the gravitational seating of the CD; holders with enlarged bases to provide area for promotional company logos; several holders in an array to provide multiple disk storage, etc.

Accordingly, the scope of the invention should be determined not by the embodiments illustrated, but by the appended claims and their legal equivalents.

We claim:

1. A single piece trihedrally shaped homogeneous clip, said clip comprising a attachable base from which flexible arms project along a folded plane of said base in a inwardly biased position, contiguous tapered nose sections with a reduced conical cross section projecting from said arms, arched further inwardly with rounded leading edges forming outermost points of initially an increased and subsequently further decreased conical cross sections, terminating in near contact with each other, whereby releasably suspend a disc or other similar object via a hole in said object.

* * * * *